United States Patent [19]

Bleiweiss

[11] 3,731,058
[45] May 1, 1973

[54] AQUARIUM HEATER
[75] Inventor: Eugene Bleiweiss, Maywood, N.J.
[73] Assignee: Metaframe Corporation, Maywood, N.J.
[22] Filed: Jan. 20, 1971
[21] Appl. No.: 108,030

[52] U.S. Cl. ..................219/523, 219/331, 219/335, 219/534, 219/542, 338/229, 338/265, 338/301
[51] Int. Cl. ..........................H05b 3/80, H01c 1/02
[58] Field of Search......................219/280, 316, 318, 219/331, 335–338, 533, 534, 538, 542, 544, 546, 548, 551–553; 338/229, 233–238, 243, 261, 264–270, 273, 296–305, 321, 326

[56] References Cited

UNITED STATES PATENTS 1,964,573   6/1934   Hanson ................................219/355

FOREIGN PATENTS OR APPLICATIONS 5,723   3/1912   Great Britain........................219/542

Primary Examiner—A. Bartis
Attorney—Friedman & Goodman

[57] ABSTRACT

A heating coil in an aquarium heater housing which comprises an electrically insulative support member, being helically enwrapped the support member helically with an electric heating element, the helically enwrapped support member being disposed in an aquarium heater housing, and the entire helically arranged heating element being maintained in spaced relation with the interior of the aquarium heater housing. The support member is provided with a plurality of longitudinally spaced transverse limbs which act to define a plurality of longitudinally spaced slots. The heating element is helically seated entirely within the slots so that it and the heater housing are maintained in spaced relation by the transverse limbs contacting the interior of the housing. The support member is also provided with a longitudinally extending limb engaging a closed end of the housing for maintaining the heating element and the housing in longitudinally spaced relation.

5 Claims, 5 Drawing Figures

Patented May 1, 1973
3,731,058
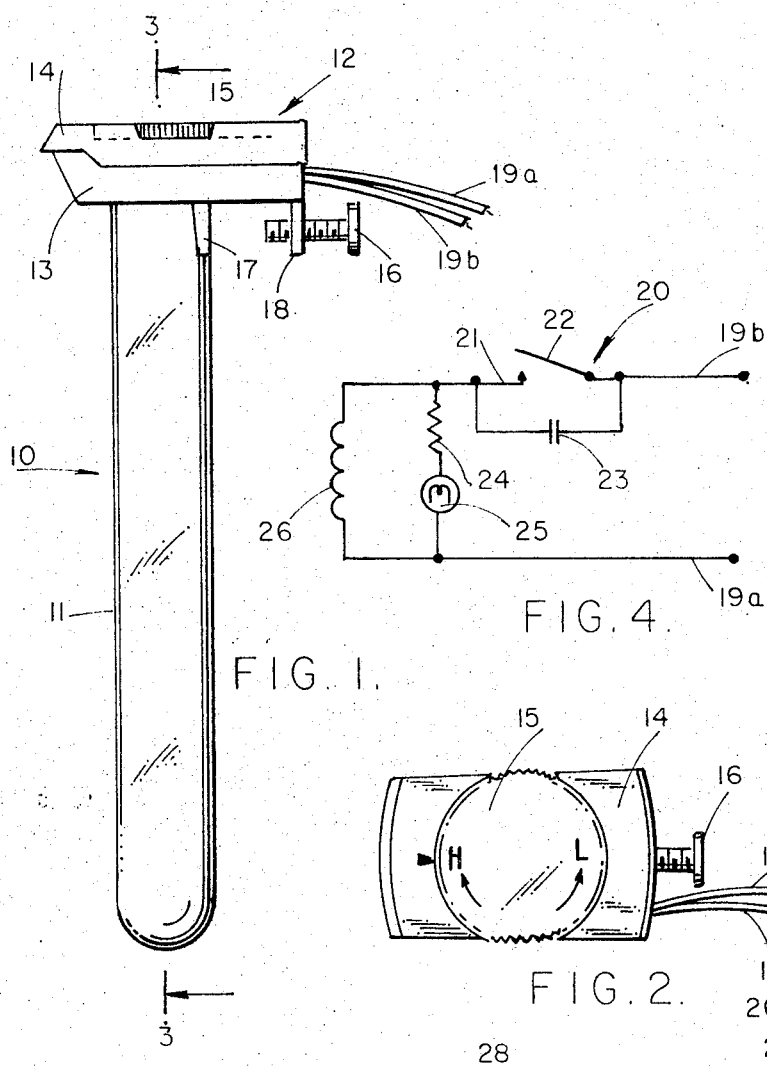
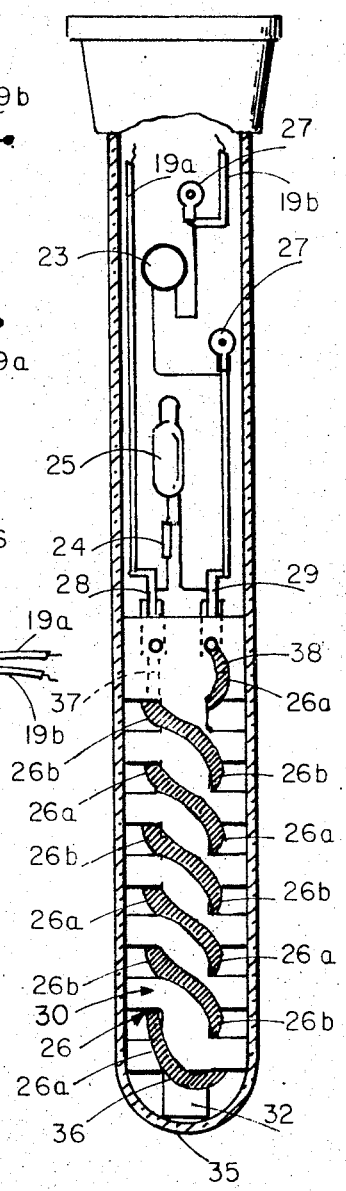
EUGENE BLEIWEISS
INVENTOR
BY Friedman + Goodman
ATTORNEYS

1

AQUARIUM HEATER

BACKGROUND OF THE INVENTION

This invention relates generally to an aquarium heater and particularly to a heater of this type having temperature control means.

In the past, many attempts have been made at providing an aquarium heater that can be used efficiently and for extended periods without the aquarium heater housing being subjected to localized heat spots which can damage or crack the latter. In this respect, the heating coil has heretofore been positioned internally in the heater housing in various arrangements and on various supporting members all of which have proved to be unsatisfactory as their respective configurations are complex and therefore expensive to produce. Furthermore, these complex arrangements result in potential short circuiting of the heating coil and accordingly, there is the possibility of immediate damage to the heater at the very least and certainly the possibility of fire.

SUMMARY OF THE INVENTION

Accordingly, it is an object of this invention to provide a thermostatically controlled aquarium heating device which may be readily and economically produced and assembled on a large scale.

It is also an object of this invention to provide a device of this character which has an improved heating coil arrangement and means for supporting the coil arrangement in the heater housing to provide uniform heating of the latter.

Another object of the invention is to provide an improved coil support member which positions the coil in the housing in spaced relation with the latter to prevent hot spots and breakage of the latter.

Another object of the invention is to provide improved means for affording ready access to the interior of a heater of the character indicated and to the support member and other operative parts contained in the heater housing.

Another object of the invention is to provide an improved double-helix coil winding which reliably prevents short-circuiting.

It is also an object of the invention to provide a device of the character indicated which is efficient in operation, attractive in appearance and one wherein many of the parts may be formed of readily available material of low cost.

It is still a further object of the present invention to provide an improved heating coil support member constituted of material of minimal weight to enhance a reduction of its inertial tendency when handled or shipped so as to obviate potential breakage of the glass housing therefor.

It is another object to obviate the necessity of further insulating material other than that of the support member to provide a more economical heater.

The above objects are effected by providing an aquarium heater housing which is provided with an electric heating element that is helically enwrapped about a slotted electrically insulative support member, which support member maintains the heating element and the interior of the heater housing in spaced relation uniformly throughout. Furthermore, the heating element is enwrapped about the support member such that there is defined two mutually crossing helically extending portions which are free from contact with one another and which terminate mutually at one end of the support member proximate one another for providing a uniform dispersal of heat substantially throughout the entire heater housing. The heating element is entirely seated within the slots so that a plurality of transverse limbs disposed on opposite sides of the support member engages the interior of the housing and maintains the heating element in a spaced relation with the housing. The support member is also provided with a longitudinally extending limb engaging a closed end of the housing for maintaining the heating element and the housing in longitudinally spaced relation.

BRIEF DESCRIPTION OF THE DRAWINGS

With the above and additional objects and advantages in view as will hereinafter appear, this invention comprises the devices, combinations, and arrangements of parts hereinafter described and illustrated in the accompanying drawings of a preferred embodiment in which:

FIG. 1 is a side elevational view of an embodiment of the thermostatically controlled aquarium heater in accordance with the present invention;

FIG. 2 is a plan view thereof;

FIG. 3 is an enlarged partial cross-sectional view taken along the line 3—3 of FIG. 1 and illustrates the helical heating coil assembly as arranged in the heater housing;

FIG. 4 is a diagrammatic view of the thermostat wiring system; and

FIG. 5 is an enlarged view of the support member for positioning the helical heating coil.

DETAILED DESCRIPTION OF THE INVENTION

Referring to the figures in which similar reference numerals identify the same or similar parts throughout, an embodiment of the invention is illustrated. As may be seen from FIG. 1, the instant aquarium heater, designated generally by the numeral 10, comprises an elongate heat-resistant and transparent housing tube 11 which is suspended at its open end from a casing 12 comprising lower and upper cases 13 and 14 respectively and is provided with a temperature control knob 15 disposed upon the upper case 14. The aquarium heater 10 is mounted in a conventional manner upon the rim of an aquarium tank, not shown, by means of engagement of clamping screw 16 with the peripheral edge of the tank which is disposed between the end of the clamping screw and a pair of downwardly projecting bosses 17, only one of which is shown, each of which being disposed forwardly of the clamping screw and laterally of the axis thereof. The clamping screw is threadedly supported by a depending bracket member 18. The lower portion of the heat-resistant tube 11 contains the heating assembly which will be discussed further below and is immersed below the water level of the tank when in use. Suitable electrically conductive leads 19a and 19b project from the casing 12 for connection to a source of electric power.

As shown generally in FIG. 3 and schematically in FIG. 4, there is included a switching and indicating system which comprises a thermostat generally indicated at 20 in FIG. 4 having a bi-metallic fixed station 21 and an adjustable station 22. The thermostat may be of any conventionally well known type, as one skilled in the art may readily appreciate, and therefore, the details thereof are not further discussed herein other than the fact that the adjustable station 22 is controllable by means of the control knob 15 shown generally in FIG. 2, which control knob 15 can be turned in the direction of arrow H for increasing the temperature in the aquarium and in the direction of arrow L for decreasing the temperature in the aquarium.

A spark supressing condensor 23, as shown in FIG. 4, is electrically coupled in parallel with the thermostat 20. As shown in FIG. 4, there is also provided a resistor 24 and an indicating bulb 25 electrically coupled in series with one another and together electrically coupled in parallel with a heating coil 26, the latter heating coil being constituted of electrically conductive material. As shown generally in FIG. 3, the schematic circuit of FIG. 4 includes intermediary connecting elements 27 for electrically interconnecting the leads which are electrically coupled with the condensor 23. Also shown in FIG. 3 are lead terminals 28 and 29 which initiate respectively from the leads 19a and 19b, the latter being connectable to a source of electric power.

FIG. 5 illustrates a perspective view of the support member 30, according to the present invention, having an upper end 31 to which the lead terminals 28 and 29 are mechanically coupled. The support member 30 is provided with longitudinally spaced transverse limbs 34 which extend outwardly from the longitudinally extended opposite edges thereof. The transverse limbs 34 act to define a plurality of longitudinally spaced slots 33. The support member 30 terminates at its opposite end in a longitudinally extending limb 32, the function of which will be described below.

As illustrated in FIG. 3, the heating coil is helically enwrapped about the support member 30 and the helical turns are respectively seated in the slots 33 of the latter. Furthermore, as clearly illustrated in FIG. 3, the heating coil 26 has two mutually crossing helically extending portions 26a and 26b which are continuously enwrapped throughout the entire extent thereof about the support member 30, which helical portions are clearly free from contact with one another as they are seated in the slots 33 of the support member 30 and maintained in spaced relation with one another by the transverse limbs 34.

Also clearly illustrated in FIG. 3, the limbs 34 are co-extensive with one another and are substantially of the same lateral dimension as that of the inner diameter of the tube housing 11. In this manner, the support member 30 fits snugly in the housing 11, free of lateral play therein and therefore, the heating coil 26 is maintained in a fixed lateral position in laterally spaced relation with the housing 11.

Similarly, FIG. 3 illustrates that the longitudinal limb 32 engages the lowermost closed end 35 of the tube 11 which therefore maintains the lowermost portion 36 of the helical heating coil 26 in longitudinally spaced relation with the latter closed end 35.

The terminal ends 37 and 38 of the helical heating coil 26 terminate mutually at the upper end 31 of the support member 30 proximate one another and are electrically coupled with leads 28 and 29 respectively.

In operation, the present invention functions such that electrical energy supplied to the leads 19a and 19b is controlled by the thermostat 20, the latter which acts as a switching means for passing current selectively to the heating coil 26. When current is passed to the coil 26, the indicating bulb 25 signals such condition. The support member 30, which is constituted of electrically insulative material such as mica, asbestos or similar light-weight refractory material, and extends in a flat strip, acts to fixedly position the heating coil 26 in spaced relation with the heater housing 11. Furthermore, since the heating coil 26 is provided with two mutually crossing helical portions over the entire extent thereof, there is provided a uniform heating of the heater housing 11 in the most efficient manner and there is prevented the possibility of localized formation of hot spots which can ultimately result in the breakage of the heater housing. Again, the helical turns of the heating coil 26 are free from contact with one another and, therefore, there is eliminated the possibility of short circuiting.

It is clear that since the support member 30 is of a flat configuration and constituted of a light-weight refractory material, rather than of rounded cross-section and heavy ceramic material, there is prevented excessive inertia when handled or shipped which would otherwise cause breakage of a housing 11 constituted of glass.

While there is shown and described a preferred embodiment of my invention, it will be apparent, however, that this invention is not limited to this embodiment and that many changes, additions and modifications can be made in connection therewith without departing from the spirit and scope of the invention as herein disclosed and hereinafter claimed.

What is claimed is:

1. An aquarium heater comprising a hollow glass housing provided with a closed end, an electric heating element, means for controlling passage of electrical energy to said heating element, means for supporting said heating element in said housing in a general helical configuration with said heating element in spaced relation with said housing, said supporting means comprising a elongate flat member of electrically insulative material having two longitudinally extending opposite edges, said elongate member including a plurality of longitudinally spaced transverse limbs extending from each of said opposite edges with said transverse limbs of one of said opposite edges being co-extensive with associated transverse limbs of the other opposite edge to define a plurality of longitudinally spaced slots at each of said opposite edges, said heating element being helically wound on said elongate member with turns thereof seated in said slots and having a maximum diametral extent substantially less than extent of said transverse limbs and being so wound on said elongate member in such manner as to remain entirely laterally inwardly of said slots with there being one of said heating element turns for each of said slots, said elongate member including a pair of longitudinally spaced opposite end portions, said heating element including mutually crossing helical portions having respective end terminals terminating proximate one another mutually at one of said end portions of the elongate member, said mutually crossing helical portions extending in a common direction and being free from contact with one another, said transverse limbs being seated in contact with interior of said housing to provide a flush relation for maintaining said heating element in a fixed lateral position so that said heating element is maintained in a laterally spaced relation with said interior of said housing, and said elongate member including a longitudinally extending limb engaging said closed end of said housing for maintaining said heating element and said housing in longitudinally spaced relation.

2. An aquarium heater as claimed in claim 1, wherein said means for supplying electrical energy to said heating element includes thermostat means for controlling the duration of the supply of electrical energy to said heating element.

3. An aquarium heater as claimed in claim 2, including visual indicating means for indicating the period of supply of electrical energy to said heating element.

4. An aquarium heater as claimed in claim 1, wherein said housing is tubular and transparent.

5. An aquarium heater as claimed in claim 1, wherein said means for supporting said heating element is constituted of mica.

* * * * *